US010567842B2

(12) United States Patent
Greene (10) Patent No.: US 10,567,842 B2
(45) Date of Patent: Feb. 18, 2020

(54) INTELLIGENT CONTENT MANAGEMENT SYSTEM

(71) Applicant: ECHOSTAR TECHNOLOGIES L.L.C., Englewood, CO (US)

(72) Inventor: Gregory Greene, Littleton, CO (US)

(73) Assignee: dish technologies llc, Englewood, CO (US)

( * ) Notice: Subject to any disclaimer, the term of this patent is extended or adjusted under 35 U.S.C. 154(b) by 0 days.

(21) Appl. No.: 14/587,591

(22) Filed: Dec. 31, 2014

(65) Prior Publication Data

US 2016/0192013 A1   Jun. 30, 2016

(51) Int. Cl.
| | |
|---|---|
| *H04N 21/462* | (2011.01) |
| *H04N 21/472* | (2011.01) |
| *H04N 21/218* | (2011.01) |
| *H04N 21/8352* | (2011.01) |
| *H04N 21/2665* | (2011.01) |

(52) U.S. Cl.
CPC ....... *H04N 21/4622* (2013.01); *H04N 21/218* (2013.01); *H04N 21/2665* (2013.01); *H04N 21/47202* (2013.01); *H04N 21/8352* (2013.01)

(58) Field of Classification Search
CPC ............. H04N 21/8352; H04N 21/218; H04N 21/2665; H04N 21/4622; H04N 21/8358; H04N 7/08; H04N 7/025; H04N 21/235; H04N 21/84; G06T 1/0028; G06T 2201/0065; G06T 2201/0051; G06T 2200/28
See application file for complete search history.

(56) References Cited

U.S. PATENT DOCUMENTS

| | | | | |
|---|---|---|---|---|
| 2003/0051246 A1* | 3/2003 | Wilder | ............... | H04N 5/44543 |
| | | | | 725/49 |
| 2008/0141317 A1* | 6/2008 | Radloff | .............. | H04N 5/44582 |
| | | | | 725/87 |
| 2010/0037179 A1* | 2/2010 | Ito | ........................... | G06F 16/54 |
| | | | | 715/838 |

(Continued)

FOREIGN PATENT DOCUMENTS

EP    2461578 A2    6/2012

OTHER PUBLICATIONS

The International Bureau of WIPO, International Preliminary Report on Patentability for International Application No. PCT/US2015/068098 dated Jul. 13, 2017.

(Continued)

*Primary Examiner* — Benjamin R Bruckart
*Assistant Examiner* — Akshay Doshi
(74) *Attorney, Agent, or Firm* — Lorenz & Kopf LLP (57) ABSTRACT

Systems, methods and devices are described to provide a content-focused television receiver that allows viewers to select programming from multiple broadcast, stored media, video on demand or other sources based upon the program content itself rather than the source of the program. A set top box or other television receiver device receives a viewer input that identifies a particular television program for viewing. The television receiver device queries for information that identifies one of the different sources that is able to provide the particular television program for viewing, and obtains the program from the identified source for playback to the viewer.

17 Claims, 4 Drawing Sheets

(56) References Cited

U.S. PATENT DOCUMENTS

| | | | |
|---|---|---|---|
| 2011/0158610 A1* | 6/2011 | Paul ................ | G06F 17/30029 |
| | | | 386/297 |
| 2012/0233640 A1 | 9/2012 | Odryna et al. | |
| 2012/0278844 A1* | 11/2012 | Curtis ............... | H04N 21/4147 |
| | | | 725/93 |
| 2012/0311637 A1* | 12/2012 | Anthru .................. | H04N 5/445 |
| | | | 725/44 |
| 2014/0007146 A1* | 1/2014 | Peterson ........... | H04N 21/2543 |
| | | | 725/5 |
| 2014/0052453 A1 | 2/2014 | Koivuniemi et al. | |
| 2014/0068668 A1* | 3/2014 | Needham .......... | H04N 5/44543 |
| | | | 725/39 |
| 2014/0208360 A1* | 7/2014 | Kardatzke ........... | H04N 21/482 |
| | | | 725/48 |
| 2014/0344861 A1* | 11/2014 | Berner ............... | H04N 21/4826 |
| | | | 725/46 |

OTHER PUBLICATIONS

European Patent Office International Searching Authority, International Search Report and Written Opinion for International Application No. PCT/US2015/068098 dated Mar. 21, 2016.

\* cited by examiner

INTELLIGENT CONTENT MANAGEMENT SYSTEM

TECHNICAL FIELD

The present disclosure generally relates to television receivers and home media systems, and more particularly to the selection of programming presented by a television receiver or other media device.

BACKGROUND

Television programming is now available from an increasingly-large number of sources. In addition to the traditional cable, direct broadcast satellite (DBS) and terrestrial television broadcast sources of television programming, many viewers now obtain their television content from video on demand (VOD) services, remote storage digital video recorders (RSDVRs), local storage digital video recorders (LSDVRs), personal video recorders (PVRs), placeshifting devices, web services and/or any number of other sources.

Although these new sources of programming sources generally improve the available viewing options, the sheer number of programming options available from all of the different sources can be overwhelming to some viewers. At the very least, it can be a real challenge to locate a particular program from the various sources that may be available. Even though electronic programming guides (EPGs) can be helpful, most current guides are limited in the number of sources they can consider, thereby limiting their usefulness to the viewer.

It is therefore desirable to create systems, devices and methods for efficiently and effectively locating content from multiple sources that may be available to the viewer. These and other desirable features and characteristics will become apparent from the subsequent detailed description and the appended claims, taken in conjunction with the accompanying drawings and this background section.

BRIEF SUMMARY

Systems, methods and devices are described to provide a content-focused television receiver that allows viewers to select programming from multiple broadcast, stored media, video on demand or other sources based upon the program content itself rather than the source of the program. A set top box or other television receiver device receives a viewer input that identifies a particular television program for viewing. The television receiver device queries for information that identifies one of the different sources that is able to provide the particular television program for viewing, and obtains the program from the identified source for playback to the viewer.

Additional embodiments could provide other systems, devices, remote devices, media players, software programs, encoders, processes, methods and/or the like that perform these or other functions. Various embodiments, aspects and features are described in detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a set top box (STB) or other television receiver device provides an integrated content management service (ICMS) that focuses on particular television programs that are available, rather than the channels, networks or other sources of programming. The viewer selects a program for viewing, and the receiver obtains the selected program from whatever source may be available to the receiver, including broadcast sources (e.g., cable, DBS, terrestrial broadcasts), stored content (e.g., content stored in a DVR), content available from video on demand (VOD) services, and/or any other sources of programming as appropriate. Various embodiments therefore allow the viewer to focus on the programming content itself rather than the source of the programming. The general program-centric approach to operating a receiver device may be enhanced or modified in many different ways, and many of these options are described herein.

Figure 1:
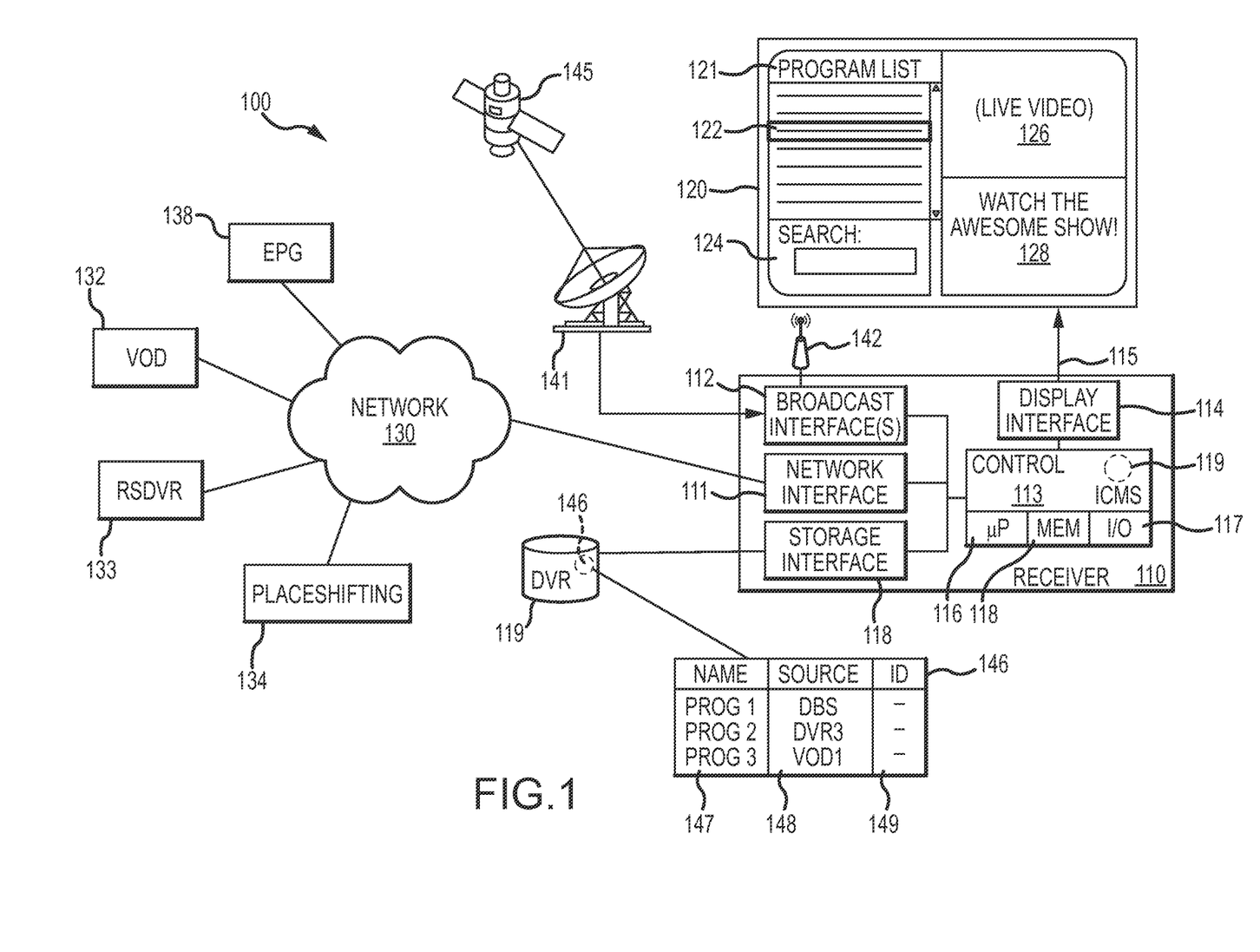
FIG. 1 is a block diagram of an example television system that incorporates intelligent content management.

Turning now to the drawing figures and with initial reference to FIG. 1, an example of a television content delivery system 100 suitably includes a television receiver device 110 that receives programming content from one or more sources. In the example illustrated in FIG. 1, receiver 110 generates output signals 115 that produce output imagery on display 120. The output imagery may include, in various embodiments, a program list 121 and/or a search window 124 that allows the viewer/user to select a particular program that is of interest. The receiver 110 is then able to identify an appropriate source for the selected content and to provide the selected program content from the identified source. By focusing on the program content rather than the source, the user experience can be greatly improved.

In the example illustrated in FIG. 1, television receiver 110 is able to receive content from one or more broadcast sources 141, 142; from one or more network services 132, 133, 134; from local or remote storage 119; and/or from any other sources as desired. Generally speaking, receiver 110 executes an integrated content management system (ICMS) application 119 that provides many of the various functions described herein. Application 119 may be stored in memory 118 for execution by processor 116, or by other hardware in controller 113 or device 110.

Receiver 110 is any device, component, circuitry or logic capable of receiving and processing video programming content. As shown in FIG. 1, receiver 110 includes a television receiver interface 112, a controller 113 with an appropriate processor 116, memory 118 and input/output interfaces 117, and a display interface 114 as appropriate. In various embodiments, receiver 110 is a conventional television receiver (e.g., a set top box or other broadcast, satellite and/or cable television receiver) capable of receiving signals via one or more broadcast sources 141, 142 and of providing an output signal 115 that can be provided for presentation to the viewer. In various embodiments, display 120 is any sort of television or other monitor that is capable of receiving a program signal 115 from a set-top box, decoder or other external receiver 110 as desired. Receiver 110 may be equivalently implemented as a DVD or other player that is capable of rendering content stored on any optical, magnetic and/or other portable media. In still other embodiments, receiver 110 is a media player capable of receiving media streams over a communications network (e.g., the Internet, a local or wide area network, and/or any sort of wireless telephony network). In such embodiments, receiver 110 may be implemented using a software program that executes on conventional computer hardware, such as a personal computer, personal digital assistant, mobile telephone, video game player and/or the like. While equivalent concepts could be applied to commercial-type services, receiver device 110 is typically implemented as a consumer-type device that is intended to be operated within a user's home or other premises under the direction of a family or other small group of individual viewers.

Receiver interface 112 is any hardware, firmware and/or software interface capable of receiving programming content. In various embodiments, receiver interface implements a demodulator/decoder feature for receiving and demodulating digital television programming over a broadcast, satellite, and/or cable programming link. Interface 112 may provide a tuning functionality as well, and/or may tune an external receiver such as the outdoor unit associated with a digital broadcast satellite installation. In the example illustrated in FIG. 1, receiver interface 112 receives broadcast program signals 141 from a DBS satellite service 145 as well as signals 142 from a terrestrial television broadcast. Other embodiments may additionally or alternately receive broadcast programming signals from a cable provider, an IPTV provider, and/or any other services as desired. Although FIG. 1 shows one receiver interface 112 receiving both signals 141 and 142, in practice two or more separate receiver interfaces 112 may be provided. Additionally, some interfaces 112 may be able to support multiple tuners so that multiple channels can be simultaneously received and tuned.

Network interface 111 is a conventional hardware and software interface to a digital network 130 such as the Internet, a private or public network, and/or any local area, telephone and/or other network having access to the Internet or another network. In various embodiments, network interface 111 allows communications with services (e.g., services 138, 132, 133) operating on network 130. Network interface 111 may also support IPTV or similar services, as desired. Generally speaking, communications with network services 132, 133, 138 will be initiated and controlled by controller 113 but will take place via network interface 111, as appropriate.

The example television receiver 110 illustrated in FIG. 1 also includes a storage medium 119. Storage medium 119 may be implemented as additional memory, as a disk drive, or in any other manner. Many embodiments may provide a digital video recorder (DVR) or other recording feature that allows content to be stored in storage medium 119 for later viewing. Storage interface 119 may equivalently receive programming from a DVD or other portable media, or any other source as desired.

Controller 113 is any sort of control logic or the like that interacts with receiver interface 112 and display interface 114 to output imagery to the viewer on display 120. Controller 113 also controls the selection, reception, storage and processing of video content via receiver interface 112. Additional detail about such processing is provided below with respect to FIGS. 2-4.

In various embodiments, controller 113 may be implemented using any sort of microprocessor, microcontroller, digital signal processor or other processor 116 capable of directing the actions and processes of receiver 110. Typically, processor 116 will be associated with any sort of memory 118, such as any sort of static, dynamic, flash or other memory capable of storing programming instructions and/or data for processing by processor 116. Conventional input/output interfaces 117 (e.g., bus or network interfaces, command and control interfaces and the like) will also be provided. In various embodiments, receiver 110 is based upon a "system on chip" (SoC) implementation that incorporates a hybrid microcontroller 116 with memory 118, input/output and/or other features 117 to perform the various signal processing and other actions of receiver 110. Various SoC and other integrated hardware implementations are available from Texas Instruments, Conexant Systems, Broadcom Inc., and many other suppliers as appropriate. Other embodiments may implement processor 116 and/or memory 118 using any sort of application specific integrated circuit (ASIC) or the like. Still other embodiments may implement processor 116 and/or the other features of receiver 110 with any number of discrete and/or integrated processing components (e.g., any sort of microprocessor or microcontroller), memories 118, input/output features 117 and/or other features as desired.

Display interface 114 is any physical and/or logical interface to display 120. As noted above, in some implementations receiver 110 and display 120 are provided in an integrated product (e.g., a conventional television). In other embodiments wherein receiver 110 provides video output signals 115 to an external display 120, such signals 115 may be provided in any compatible format. In embodiments wherein display 120 is a conventional television, for example, display interface 114 may provide video output signals 115 in any conventional format, such as component video, composite video, S-video, High-Definition Multimedia Interface (HDMI, e.g., any version of the CEA-861 standards), Digital Visual Interface (DVI), IEEE 1394, universal serial bus (USB) and/or any other formats as desired.

Display 120 is any sort of television, monitor and/or other display capable of presenting video imagery to a viewer. In various embodiments, display 120 operates in conjunction with receiver 110 to generate video imagery on display 120 in any manner. Other embodiments may combine the functions and components of receiver 110 and display 120 into a common housing, as in a conventional television with a built-in tuner or other receiver.

In the example of FIG. 1, imagery presented on display 120 suitably includes a search feature such as a search window 124 that allows the viewer to enter a program name or other information of interest. Other embodiments may additionally or alternately provide a scrollable program list 121 that includes a listing of programs available from any number of different sources. In such embodiments, programs may be alphabetized or otherwise ordered for convenient presentation without regard to the source of the program. That is, programs from broadcast sources, stored media, video on demand and/or other services can be presented to the viewer in a common list 121. The viewer selects a desired program by manipulating a cursor 122 or other interface feature as appropriate using a remote control or the like. The example interface shown in FIG. 1 also includes a window 126 for showing live video, and an advertising window 128 for showing advertisements, notices or other information. The particular interface shown in FIG. 1 is intended as an example, and any number of equivalent embodiments may use any sorts of interfaces providing any sort of information and receiving viewer inputs in any manner.

The television receiver device 110 obtains the selected content from any available source, as appropriate. In various embodiments, device 110 maintains a database 146 or other listing of available programs that can be searched for additional information about the selected program. In the embodiment shown in FIG. 1, database 146 is shown stored in mass storage 119, although other embodiments may store the database 146 in memory 118 or in other storage that is available to device 110. Database 146 will typically be searchable based upon program name 147, and will include sufficient information to allow the receiver device 110 to obtain the program content for presentation to the viewer. The database 146 may include, for example, an identification 148 of the source (e.g., DBS, terrestrial broadcast, cable, DVR, VOD, etc.) as well as additional information 149 to further identify the particular program. Additional information 149 might include distributor or broadcaster codes, codes obtained from an electronic program guide (EPG), broadcast date/time/channel information, and/or any other identifying information as desired.

FIG. 1 shows several examples of online services 132, 133,134 that could act as sources of program content. A video on demand service 132, for example, may provide a library of programs in a streaming format that can be received via interface 111 and played back by receiver 110. Examples of VOD services include many different private and public services, including the NETFLIX service, the AMAZON PRIME service, the HULU and CRACKLE services, and/or any number of other public or private services.

Other types of online services could include remote service digital video recorders (RSDVRs) 133, private or public placeshifting services 134, and/or the like. These services typically provide access to remotely-stored video content via streaming video, as appropriate.

Database 146 may be populated with information from an electronic program guide (EPG) service 138. In some implementations, this information is supplemented by information gathered by the receiver device 110, such as information about information stored on the viewer's personal PVR or DVR and/or other information as desired. In other embodiments, receiver device 110 creates its own database 146 from available data, as described below in conjunction with FIG. 2

Selected television content is obtained from any source. As noted above, content may be received from a live broadcast, from a previously-stored broadcast, from a video on demand service, and/or any other service as desired. Moreover, the various services may be ranked or prioritized as desired to provide the best possible service to the viewer, subject to any available constraints. Additional detail about source prioritization is provided below.

In practice, then, receiver 110 suitably receives television-type programming in any number of different sources. The programming may be received via receiver interface 112 from any broadcast or other transmission source, via network interface 111 from any sort of streaming or other remote media source, via storage interface 118 from a DVR, media player, hard drive, memory stick or other local source, and/or from any number of other media sources as desired.

Figure 2:
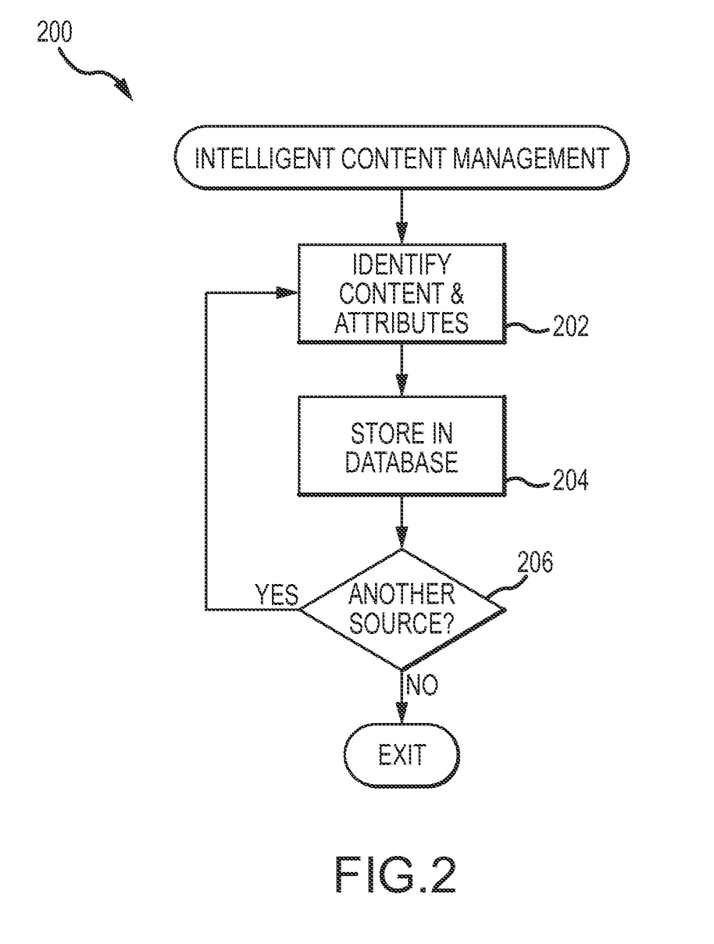
FIG. 2 is a flowchart of an example process executable by a television receiver device to gather information about programs available from multiple sources.

Turning now to FIG. 2, an example process 200 to create a database 146 of program content suitably includes the broad steps of identifying programs and their attributes (function 202), storing the information in database 146 (function 204), and continuing the operations for multiple content sources (function 206) as desired. In some embodiments, process 200 may be executed by the ICMS application 119 executed by receiver device 110. This allows each viewer's receiver 110 to create a customized list of programs that are available to that particular viewer, considering that particular viewer's unique subscriptions to pay TV or VOD services, programs recorded in local storage 119, access to placeshifted content and/or any other individualized factors as desired.

The receiver device 110 identifies content and its attributes as appropriate (function 202). In various embodiments, the receiver device no queries the various sources of available content on an a priori basis so that the database is complete (or relatively complete) before the viewer searches for a desired program. In such cases, program content may be identified in any manner. Generally speaking, each source will provide a program list or guide that provides the desired information. In the case of DBS or cable programming, for example, receiver 110 may obtain current and future program schedules through a conventional EPG that is delivered with the program content, or separately (e.g., through an out-of-band delivery, or even from a separate service 138 operating on network 130). Most conventional DVRs maintain program lists that can be shared with device 110 (to the extent that device does not already have such data). VOD services will typically provide program lists in an appropriate format; if content lists are not available directly from the source itself, EPG service 138 or the like may provide the content to device no for inclusion in database 146.

Database 146 is formatted as appropriate to include a searchable program name (e.g., as a key field or the like), as well as any additional information that is useable by device no to subsequently locate the identified program. As noted above, such information may include a source identifier 146 that specifies the source of the particular program, and any other program identification materials 149 as desired.

In the example shown in FIG. 2, receiver 110 obtains program lists and identifying data from more than one program source (function 206). Ideally, each of the program sources available to receiver 110 would make program list information available on an a priori basis to allow receiver 110 to construct a complete and accurate program list 121, and to allow for faster searching of database 146. Other embodiments may not be able to fully integrate all of the program content into database 146 due to technical or licensing constraints, or other factors. Such services may nevertheless be queried on an as-needed basis to search for particular programs identified by the viewer.

Database 146 is suitably formatted and stored by receiver 110 (function 204). As noted above, database 146 may be stored in mass storage 119, memory 118 and/or any other storage available to receiver 110, including any sort of cloud or remote storage. To that end, database 146 may be equivalently created at server 138 or by another remote processor separate from device 110. In still other embodiments, database 146 may be omitted, and receiver device 110 may simply query the various sources until it locates requested content. In most embodiments, however, it will be desirable to have at least some database 146 available to device 110 for faster searching. This database 146 may be compiled by receiver 110 itself or by service 138, and database 146 may be supplemented with content from other sources as desired.

Figure 3:
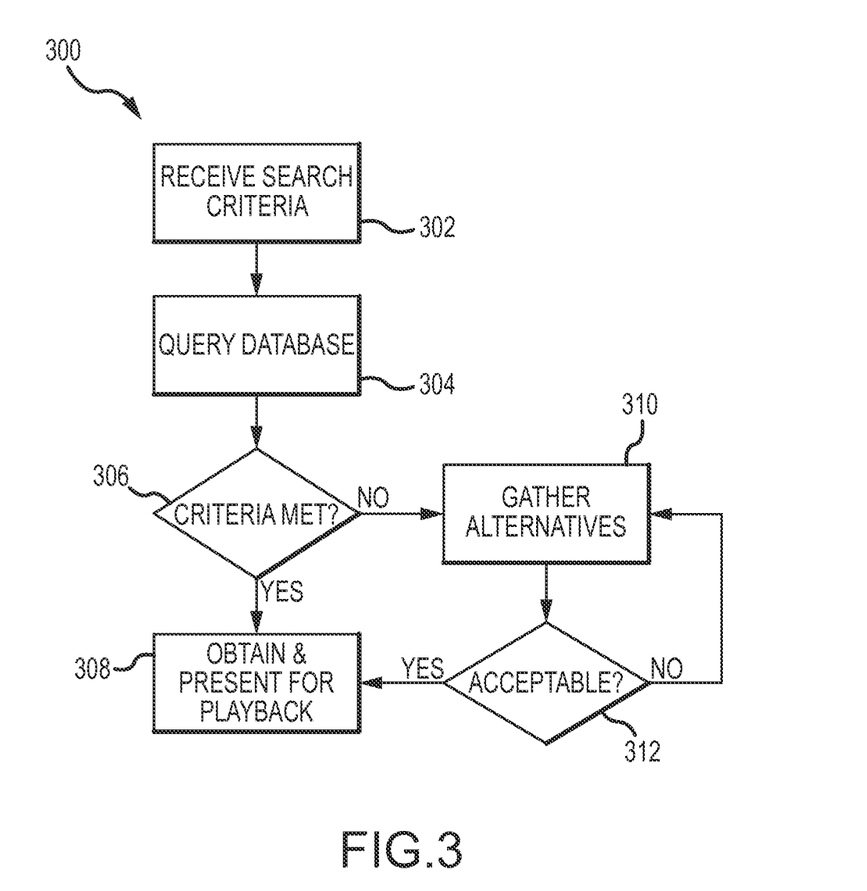
FIG. 3 is a flowchart of an example process executable by a television receiver device to process queries and to provide programs from multiple sources for playback to a viewer.

FIG. 3 shows an exemplary process 300 executable by a receiver device 110 to handle requests for particular programs. As shown in FIG. 3, the receiver device 110 suitably receives search criteria that indicates a selected program from the viewer (function 302). The viewer may provide this criteria using any sort of interface feature, such as program listing 121 and/or search window 124 described above.

Receiver 110 uses the search criteria to identify and obtain the desired programming in any appropriate manner (function 304). In the example of FIG. 3, receiver 110 posits a query to the previously-formatted database 146 using the search criteria, and database 146 returns identifying information (e.g., source information 148 and/or any additional information 149) that allows the receiver 110 to locate, tune, stream or otherwise obtain the appropriate content. In embodiments wherein an a priori database 146 is not available, receiver 110 may query the various data sources in series (or parallel) until a match is found. For example, receiver 110 may initially query a list of programs stored on a DVR, followed by an EPG associated with a broadcast service, followed by a program list associated with a VOD service if a complete database is not otherwise available. Still other embodiments may take a hybrid approach where an a priori database 147 of some, but not all, program sources is created, and any queries that are not resolved are posited to additional services until a match is found, as desired.

When the receiver device 110 identifies the program requested by the search criteria (function 306), then the requested program is obtained from the identified source in any suitable manner (function 308). In the case of live broadcast programming, then a tuner or other portion of interface 112 can be controlled to tune and decode the requested program. If the requested program is stored on a DVR or other storage, then the program is obtained via interface 118. If the program is a VOD program available from a service 132, 133, 134, then streaming or other data connections can be established via network interface 111. Program content is retrieved, decoded and presented for output 105 in any appropriate manner.

If the viewer's search criteria cannot be met (function 306), then options may be presented as appropriate. Perhaps the program is available, but only via a pay service for an additional fee. Perhaps only a portion of the program is available (e.g., a live broadcast that is already in progress but was not previously recorded). Or perhaps a program is only available via a low-quality stream rather than at a desired bit rate, frame rate, resolution or other quality. Such options can be presented to the viewer (function 310), and if any of the options are acceptable (function 312), the acceptable option can be obtained and presented for playback. Other embodiments may suggest alternate programming, or provide other alternatives as desired.

Figure 4:
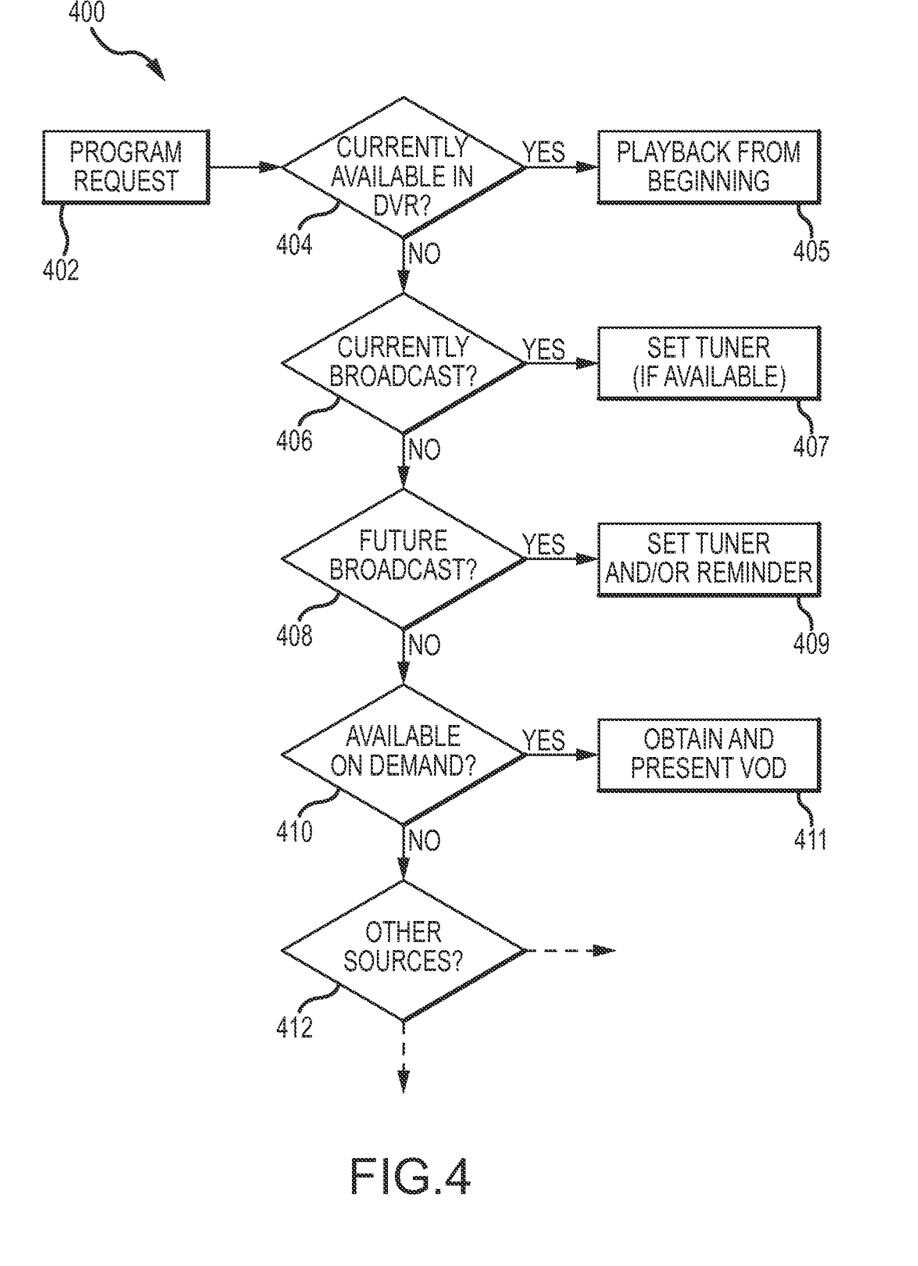
FIG. 4 is a flowchart of an example process executable by a televsiion receiver device to determine an appropriate source for a requested television program.

FIG. 4 shows one embodiment of a process 400 executable by a television receiver device to prioritize program sources and to sequentially consider multiple program sources. As shown in FIG. 4, the receiver receives the program request 402 based upon the viewer's inputs, and searches for an acceptable source for the requested programming.

In the example of FIG. 4, the user's personal DVR 119 is the first source that is considered, since this will typically provide the best quality copy at the lowest possible cost. If the requested program is already stored in the user's DVR 119 (function 404), then the receiver 110 suitably interacts with the DVR 119 to begin playback of the requested program from the beginning of the program, or at another logical starting point for the viewer's enjoyment.

If the program is not already stored on the viewer's DVR 119, then the receiver may consider whether the program is currently being broadcast by a DBS, cable, terrestrial, IPTV and/or other source (function 406). This query may be processed by checking an EPG or the like for one or more broadcast sources. If the program is being currently broadcast, then an appropriate television tuner can be assigned to receive and decode the broadcast program (function 407). In some cases, available tuners for broadcast programs may be occupied, so an alternate source could be considered. If all of the tuners for a cable or DBS receiver 110 are already occupied receiving other channels, for example, receiver 110 could consider using a separate over-the-air (OTA) tuner instead. Other embodiments could provide other enhancements as desired.

If the requested program is not currently available from a broadcast or stored media source, then the receiver 110 may consider whether the program is to be broadcast in the future (function 408). If so, then the viewer may be prompted to set a DVR timer or reminder, as desired (function 409).

Additionally or alternately, programming that is not otherwise available may be obtained from a VOD, placeshifting, RSDVR or other streaming media source (function 410). If so, then the receiver 110 will appropriately obtain the requested media stream for the requested program, decode the stream, and present the stream for output to the viewer (function 411). In various embodiments, VOD or other streaming sources may be considered to be a lower priority due to the costs involved, the need to consume bandwidth on network 130, and/or other factors. If VOD streaming incurs costs, various embodiments will notify the viewer and allow him or her to approve the costs before starting the media stream. Other embodiments may prioritize different streaming services in any manner. Some services may provide lower quality at a lower cost, for example, and the viewer could be presented with these options to select the one that is most desirable.

Other program sources (including other network services, wireless streaming services, and/or other media sources not yet implemented) could be additionally considered, as desired (function 412).

The foregoing discussion therefore presents systems, devices and processes to create a "program-centric" experience that focuses on the program content instead of the source of the content. Rather than forcing viewers to separately consider content from each unique source that may be available, various embodiments allow viewers to view and/or search a combined program directory and/or to retrieve programs based upon the program itself.

The term "exemplary" is used herein to represent one example, instance or illustration that may have any number of alternates. Any implementation described herein as "exemplary" is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a television receiver device that is operated by a viewer to provide television programming selected from any of a plurality of different sources of the television programming, the method comprising:

initially transmitting a plurality of query messages by the television receiver device, wherein each of the plurality of query messages is sent to a selected one of the different sources of the television programming by the television receiver device, wherein each of the different sources is a source of television programs to be delivered to the television receiver device for presentation of the television programs to the viewer, and wherein one of the different sources is a digital video recorder, one of the different sources is a video-on-demand source, and one of the different sources provides broadcast television programs;

receiving, by the television receiver device, a plurality of responses from the plurality of different sources in response to the query messages, wherein each of the responses comprises a listing of all of the television programs available from that one of the plurality of different sources;

in response to the plurality of responses received by the television receiver device, creating, by the television receiver device, a customized database that combines each of the received listings of the television programming available from each of the different sources available to the television receiver device, wherein the creating comprises the television receiver device assigning a source identifier to each program in the customized database that identifies the digital video recorder, the video-on-demand source, or the source of broadcast programs where the program is available, and wherein the customized database is stored by the television receiver device, and wherein the initial transmitting of query messages to the different sources and the creating of the customized database are both performed by the television receiver device on an a priori basis prior to the television receiver device receiving a viewer input that identifies a particular television program;

after creating and storing the customized database by the television receiver device, the television receiver device subsequently receiving the viewer input that identifies the particular television program for viewing, wherein the particular television program is selected from the previously-created customized database that combines all of the listings of television programming obtained from each of the different sources of the television programming available to the television receiver device;

in response to the viewer input, the television receiver device querying the customized database previously created and stored by the television receiver device to thereby identify one of the content sources available to the television receiver device that is able to provide the particular television program for viewing by the viewer based upon the source identifier associated with the particular television program in the customized database;

obtaining, by the television receiver device, the particular television program from the identified one of the digital video recorder, video-on-demand source or source of broadcast television programs; and outputting, by the television receiver device, the television program obtained from the identified source of the television programming for playback to the viewer.

2. The method of claim 1 wherein the particular television program is selected for viewing without regard to the source of the program, and wherein the database comprises, for each program available from any of the different sources of the television programming, a key field and a source identifier that uniquely identifies the source of the particular television program.

3. The method of claim 1 wherein the identifying comprises the television receiver device determining that the particular television program cannot be met and offering an alternative to the particular television program.

4. The method of claim 1 wherein the programs available from the source of broadcast television programs are described by an electronic program guide.

5. The method of claim 1 wherein the identifying comprises the television receiver device initially determining if the particular television program is available from the digital video recorder, and if so, the obtaining comprises the television receiver device obtaining the particular program from the digital video recorder.

6. The method of claim 5 wherein the identifying further comprises the television receiver device determining, if the particular television program is not available from the digital video recorder, whether the particular television program is being currently broadcast by the source of broadcast television programs.

7. The method of claim 6 wherein, if the particular television program is not available from the digital recorder and is being currently broadcast, the obtaining comprises the television receiver device tuning to receive the current broadcast of the particular television program from the source of broadcast television programs.

8. The method of claim 6 wherein the identifying further comprises the television receiver device determining, if the particular television program is not being currently broadcast, whether the particular television program will be broadcast in the future.

9. The method of claim 8 wherein, if the particular television program is broadcast in the future, the obtaining comprises the television receiver device setting a timer to record the future broadcast of the particular television program to the digital video recorder.

10. The method of claim 8 wherein the identifying further comprises the television receiver device determining, if the particular television program is not being broadcast in the future, whether the particular television program is available from the video-on-demand source, and if the particular television program is available from the video-on-demand source, the obtaining comprises the television receiver device receiving a network stream of the particular television program from the video-on-demand source.

11. A television receiver device to provide television programming selected from a plurality of different content sources to a viewer, wherein each of the different content sources is a source of television programs to be delivered to the television receiver device for presentation of the television programs to the viewer, the television receiver device comprising:

a display interface;

a network interface to a digital network configured to communicate with a video-on-demand source that is one of the plurality of different content sources;

a television receiver interface configured to receive broadcast television programs as one of the plurality of different content sources;
a digital video recorder configured to record at least some of the broadcast television programs received via the television receiver interface as another of the different content sources; and
a controller configured to perform an automated process that comprises:
initially transmitting a plurality of query messages, wherein each of the plurality of query messages is sent to a selected one of the different sources of the television programming, wherein one of the different sources is the digital video recorder, one of the different sources is the video-on-demand source, and one of the different sources provides the broadcast television programs;
receiving a plurality of responses from the plurality of different sources in response to the query messages, wherein each of the responses comprises a listing of all of the television programs available from that one of the plurality of different sources;
in response to the plurality of responses, creating a customized database that combines each of the received listings of the television programming available from each of the different sources, wherein the creating comprises the television receiver device assigning a source identifier to each program in the customized database that identifies the digital video recorder, the video-on-demand source, or the source of broadcast programs where the program is available, and wherein the customized database is stored by the television receiver device, and wherein the initial transmitting of query messages to the different sources and the creating of the customized database are both performed on an a priori basis prior to the television receiver device receiving a viewer input that identifies a particular television program;
after creating and storing the customized database, subsequently receiving the viewer input that identifies the particular television program for viewing, wherein the particular television program is selected from the previously-created customized database that combines all of the listings of television programming obtained from each of the different sources of the television programming available to the television receiver device;
in response to the viewer input, querying the customized database previously created and stored by the television receiver device to thereby identify one of the content sources available to the television receiver device that is able to provide the particular television program for viewing by the viewer based upon the source identifier associated with the particular television program in the customized database;
obtaining the particular television program from the identified one of the digital video recorder, video-on-demand source or source of broadcast television programs; and
outputting the television program obtained from the identified source of the television programming for playback to the viewer.

12. The device of claim 11 wherein the database and the digital video recorder are both stored on a common data storage by the television receiver device.

13. The device of claim 11 wherein the controller is configured to initially determine if the particular television program is available from the digital video recorder, and if so, to obtain the particular program from the digital video recorder.

14. The device of claim 13 wherein the controller is configured to determine, if the particular television program is not available from the digital video recorder, whether the particular television program is being currently broadcast and, if the particular television program is not available from the digital recorder and is being currently broadcast, to tune the television receiver interface to receive the current broadcast of the particular television program.

15. The device of claim 14 wherein the controller is configured to determine, if the particular television program is not being currently broadcast, whether the particular television program will be broadcast in the future and, if the particular television program is broadcast in the future, to set a timer to record the future broadcast of the particular television program to the digital video recorder.

16. The device of claim 14 wherein the controller is further configured to query the video on demand service on the a priori basis to obtain a listing of programs available from the video on demand service and to include the listing of programs available from the video on demand service in the database compiling the television programs available from each of the different sources, and wherein the processor is further configured to obtain the television program as a video stream from the video-on-demand service if the particular television program is not available from the digital video recorder and is not being currently broadcast.

17. The device of claim 11 wherein the identified program source is the only one of the plurality of program sources that is able to provide the particular television program for viewing.

* * * * *